United States Patent
McKenna et al.

(10) Patent No.: US 7,638,591 B2
(45) Date of Patent: Dec. 29, 2009

(54) POLYESTER ELASTOMER AND COMPOSITIONS THEREOF

(75) Inventors: James Michael McKenna, Hockessin, DE (US); Edward Maxwell de Brant Smith, Wilmington, DE (US); David J. Wrigley, Athenaz (CH)

(73) Assignee: E. I. du Pont de Nemours and Company, Wilimington, DE (US)

( * ) Notice: Subject to any disclaimer, the term of this patent is extended or adjusted under 35 U.S.C. 154(b) by 302 days.

(21) Appl. No.: 11/393,227

(22) Filed: Mar. 30, 2006

(65) Prior Publication Data

US 2006/0235187 A1 Oct. 19, 2006

Related U.S. Application Data

(60) Provisional application No. 60/669,537, filed on Apr. 8, 2005.

(51) Int. Cl.
*C08G 63/02* (2006.01)
(52) U.S. Cl. ........................ 528/272; 528/300; 528/302; 264/176.1; 264/171.2; 264/171.15; 264/171.24
(58) Field of Classification Search ................. 528/272, 528/192, 298, 301, 271, 275, 300, 302, 307, 528/308, 308.6; 264/174.11, 176.1, 171.12, 264/171.15, 171.24; 28/190, 191; 525/437, 525/173, 174, 444; 428/480, 364, 365, 359
See application file for complete search history.

(56) References Cited

U.S. PATENT DOCUMENTS

| 4,251,652 A * | 2/1981 | Tanaka et al. ............... 528/279 |
| 4,315,882 A * | 2/1982 | Hiratsuka et al. ...... 264/174.11 |
| 6,562,457 B1 | 5/2003 | Goldfinger et al. |
| 6,720,459 B2 | 4/2004 | Sunkara et al. |
| 2002/0007043 A1 | 1/2002 | Sunkara et al. |
| 2004/0254332 A1* | 12/2004 | Hayes ........................ 528/296 |
| 2005/0165205 A1* | 7/2005 | Lange et al. ................. 528/272 |

FOREIGN PATENT DOCUMENTS

| GB | 1 492 755 | 11/1977 |
| WO | WO 03/037978 A2 | 5/2003 |
| WO | WO 2004/015174 A2 | 2/2004 |

* cited by examiner

*Primary Examiner*—Ling-Siu Choi
*Assistant Examiner*—Frances Tischler
(74) *Attorney, Agent, or Firm*—Loretta Smith; Arne Jarnholm

(57) ABSTRACT

Polyetherester elastomers comprising about 25 to about 59 weight percent poly(trimethylene ether) ester soft segments and about 41 to about 75 weight percent hard segments, wherein the poly(trimethylene ether) ester soft segments are derived from poly(trimethylene ether) glycol having a number average molecular weight of about 600 to about 2500. Compositions thereof and articles made therefrom are disclosed.

19 Claims, No Drawings

POLYESTER ELASTOMER AND COMPOSITIONS THEREOF

CROSS REFERENCE TO RELATED APPLICATIONS

This application claims the benefit of priority to U.S. Provisional Application No. 60/669,537, filed Apr. 8, 2005.

FIELD OF THE INVENTION

The present invention relates to polyetherester elastomers having improved high and low temperature physical properties, compositions thereof, and articles made therefrom.

BACKGROUND OF THE INVENTION

As a result of their excellent tear strength, tensile strength, flex life, abrasion resistance, and broad useful end-use temperature range, thermoplastic polyetherester elastomers are used in a wide range of applications. For many applications, including automotive applications in particular, articles made from polyetherester elastomers can be subjected to operating temperatures that can range from about −40° C. to about 150° C. At low temperatures, the limiting factor of performance of polyetherester elastomers is typically embrittlement or loss of impact strength, while at high temperatures (such as those experienced in under the hood automotive applications), polyetherester elastomers can lose mechanical strength (for example, loss in tensile strength may be exhibited at elevated temperatures).

U.S. Pat. No. 6,599,625 discloses a polyetherester elastomer comprising about 90-about 60 weight percent polytrimethylene ether ester soft segments and about 10-about 40 weight percent trimethylene ester hard segments and their use in fibers and other shaped articles. The polymers are stated to provide an improvement in properties over those containing other glycols. U.S. Pat. No. 6,562,457 discloses a polyetherester elastomer comprising about 90-about 60 weight percent polytrimethylene ether ester soft segments and about 10-about 40 weight percent tetramethylene ester hard segments.

It would be desirable to obtain a thermoplastic polyetherester elastomer derived from poly(trimethylene ether) ester soft segments having improved high and low temperature physical properties.

SUMMARY OF THE INVENTION

There is disclosed and claimed herein a polyetherester elastomer comprising about 25 to about 59 weight percent of soft segments, wherein about 60 to 100 mole percent of the soft segments are poly(trimethylene ether) ester soft segments represented by the structure:

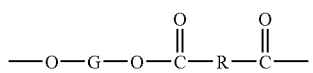

and about 41 to about 75 weight percent of hard segments, wherein about 80 to 100 mole percent of the hard segments are tetramethylene ester hard segments represented by the structure:

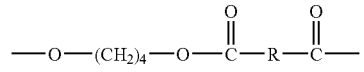

wherein G represents the divalent radical remaining after the removal of the terminal hydroxy groups of poly(trimethylene ether) glycol having a number average molecular weight of about 500 to about 2500, and R is one or more divalent radicals remaining after removal of carboxyl functionalities from one or more corresponding dicarboxylic acid equivalents. Further disclosed are compositions comprising the polyetherester elastomer and articles made from the polyetherester elastomer and its compositions.

DETAILED DESCRIPTION OF THE INVENTION

The thermoplastic polyetherester elastomer of the present invention comprises about 25 to about 59 weight percent of soft segments and above about 41 to about 75 weight percent of hard segments; or preferably about 30 to about 59 weight percent of soft segments and about 41 to about 70 weight percent of hard segments; or more preferably about 35 to about 59 weight percent of soft segments and about 41 to about 65 weight percent of hard segments.

Herein the term "soft segment" refers to the product of a reaction of a polymeric or oligomeric glycol with a dicarboxylic acid equivalent to form an ester linkage. In the polyetherester elastomers of the present invention, about 60 to 100 mole percent, or preferably at least about 75 to 100 mole percent, or more preferably at least about 90 to 100 mole percent, or yet more preferably about 95 to 100 mole percent of soft segments are poly(trimethylene ether) ester soft segments.

Herein, the term "poly(trimethylene ether) ester soft segment" refers to the reaction product of poly(trimethylene ether) glycol (referred to herein as PO3G) with at least one dicarboxylic acid equivalent.

The poly(trimethylene ether) ester soft segments can be represented by the following structure:

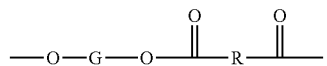

wherein R represents one or more divalent radicals remaining after the removal of carboxyl functionalities from corresponding dicarboxylic acid equivalents, and wherein G represents the divalent radical remaining after the removal of the terminal hydroxy groups of poly(trimethylene ether) glycol having a number average molecular weight of about 500 to about 2500, or preferably about 800 to about 2300, or more preferably about 950 to about 2300, or yet more preferably about 950 to 2100.

Poly(trimethylene ether) glycol (PO3G) can be prepared by any method known in the art. For example, PO3G can be prepared by self-condensation of 1,3-propanediol or by ring-opening polymerization of oxetane. Methods for making PO3G are described in U.S. Pat. No. 6,720,459 and US Patent Application Publication No. 2002/0007043, the disclosures of which are hereby incorporated by reference in their entirety. The 1,3-propanediol may be bioderived. For example, it may be obtained from a fermentation process using a renewable source such as corn starch. Poly(trimethylene ether) glycol preferably has the following structure: $H(OCH_2CH_2CH_2)_nOH$.

As used herein, the term "poly(trimethylene ether) glycol" (PO3G) refers also to polyether glycols that contain up to 40 mole percent of ether units derived from diols others than 1,3-propanediol. Examples of suitable diols include aliphatic diols having 2 to 8 carbon atoms, such as ethylene glycol and 1,4-butanediol. Examples of such polyether glycols include poly(trimethylene-ethylene ether) glycol, poly(trimethylene-1,4-butylene ether) glycol, and poly(trimethylene-ethylene-1,4-butylene ether) glycol.

Up to about 40 mole percent, or preferably up to about 25 mole percent, or more preferably up to about 10 mole percent, or yet more preferably up to about 5 mole percent of soft segments may optionally be derived from a polymeric or oligomeric glycol other than PO3G. Examples of preferred glycols include poly(ethylene ether) glycol, poly(propylene ether) glycol, poly(tetramethylene ether) glycol, poly(hexamethylene ether) glycol, copolymers of tetrahydrofuran and 3-alkyltetrahydrofuran, and copolymers of ethylene oxide and propylene oxide. The optional glycols other than PO3G preferably have a number average molecular weight of about 500 to about 3000.

Herein, the term "hard segment" refers to the reaction product of diol with carboxylic acid equivalent to form an ester linkage. In the polyetherester elastomers of the present invention, at least 80 mole percent, or preferably at least 90 mole percent, or more preferably about 95 to 100 mole percent of hard segments are tetramethylene ester hard segments. Yet more preferably 100 mole percent of hard segments are tetramethylene ester hard segments.

As used herein, the term "tetramethylene ester hard segment" refers to the reaction product of 1,4-butanediol and at least one carboxylic acid equivalent to form an ester linkage. The tetramethylene ester hard segment can be represented by the following structure:

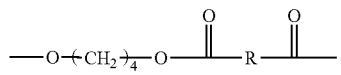

wherein R represents one or more divalent radicals remaining after the removal of carboxyl functionalities from corresponding dicarboxylic acid equivalents.

Up to about 20 mole percent, or preferably up to about 10 mole percent, or more preferably up to about 5 mole percent of hard segments in the polyetherester elastomers of the present invention may optionally be made from one or more organic diols other than 1,4-butanediol. The diols preferably have a molecular weight of less than about 400 and are preferably saturated diols that may be alicyclic or aliphatic. Preferred are diols having 2 to 15 carbon atoms such as ethylene, isobutylene, trimethylene, pentamethylene, 2,2-dimethyltrimethylene, 2-methyltrimethylene, hexamethylene and decamethylene glycols; dihydroxycyclohexane; and cyclohexane dimethanol. More preferred are aliphatic diols having 2-8 carbon atoms. Particularly preferred are ethylene glycol and 1,3-propanediol.

As used herein, by the term "dicarboxylic acid equivalent" is meant dicarboxylic acids and acid derivatives that are capable of reacting with hydroxy groups to form ester linkages. Examples of dicarboxylic acid equivalents include dicarboxylic acids, dicarboxylic acid esters and diesters, acid halides, and acid anhydrides.

The dicarboxylic acid equivalents preferably have a molecular weight of no greater than 300 and can be aromatic, aliphatic or cycloaliphatic. "Aromatic dicarboxylic acid equivalents" are dicarboxylic acid equivalents in which each carboxyl group is attached to a carbon atom in an aromatic ring or aromatic ring system. "Aliphatic dicarboxylic acid equivalents" are dicarboxylic acid equivalents in which each carboxyl group is attached to a fully saturated carbon atom or to a carbon atom that is part of an olefinic double bond. If the fully saturated carbon atom is in a ring, the equivalent is a "cycloaliphatic dicarboxylic acid equivalent." Preferred dicarboxylic acid equivalents are dicarboxylic acids, and diesters of dicarboxylic acids, especially dimethyl esters of dicarboxylic acids. Also preferred are aromatic dicarboxylic acids or diesters alone or in combination with small amounts, for example, less than about 20 mole percent of one or more aliphatic or cycloaliphatic dicarboxylic acids or diesters. Particularly preferred are dicarboxylic acids and dimethyl esters of aromatic dicarboxylic acids.

Exemplary aromatic dicarboxylic acids useful in making the polyetherester elastomers of the present invention include terephthalic acid, isophthalic acid, bibenzoic acid, naphthalic acid, substituted dicarboxylic compounds with benzene nuclei such as bis(p-carboxyphenyl)methane, 1,5-naphthalene dicarboxylic acid, 2,6-naphthalene dicarboxylic acid, 2,7-naphthalene dicarboxylic acid, 4,4'-sulfonyl dibenzoic acid, and $C_1$-$C_{10}$alkyl and ring substitution derivatives thereof, such as halo, alkoxy or aryl derivatives. Hydroxy acids such as p(hydroxyethoxy)benzoic acid can also be used, provided an aromatic dicarboxylic acid is also present. Exemplary aliphatic and cycloaliphatic dicarboxylic acids useful in making the polytrimethylene ether esters include sebacic acid; 1,3- or 1,4-cyclohexane dicarboxylic acid; adipic acid; dodecanedioic acid; glutaric acid; succinic acid; oxalic acid; azelaic acid; diethylmalonic acid; fumaric acid; citraconic acid; allylmalonate acid; 4-cyclohexene-1,2-dicarboxylate acid; pimelic acid; suberic acid; 2,5-diethyladipic acid; 2-ethylsuberic acid; 2,2,3,3-tetramethyl succinic acid; cyclopentanenedicarboxylic acid; decahydro-1,5-naphthalene dicarboxylic acid; decahydro-2,6-naphthalene dicarboxylic acid; 4,4'-bicyclohexyl dicarboxylic acid; 4,4' methylenebis(cyclohexylcarboxylic acid); 3,4-furan dicarboxylate; and 1,1-cyclobutane dicarboxylate. Dicarboxylic acid equivalents in the form of diesters, acid halides and anhydrides of the aforementioned dicarboxylic acids are also useful and especially preferred are diesters. Exemplary aromatic diesters include dimethyl terephthalate, bibenzoate, isophthlate, phthalate and naphthalate.

Preferred are terephthalic acid, bibenzoic acid, isophthalic acid, and naphthalene dicarboxylic acids; dimethyl terephthalate, dimethyl bibenzoate, dimethyl isophthlate, dimethyl naphthalate, and dimethyl phthalate; and mixtures thereof. Particularly preferred dicarboxylic acid equivalents are equivalents of phenylene dicarboxylic acids, more particularly terephthalic and isophthalic acid and diesters thereof, dimethyl terephthalate and dimethyl isophthalate. In some embodiments, two or more dicarboxylic acids equivalents can be used. For example, terephthalic acid or dimethyl terephthalate can be used with small amounts of one or more other dicarboxylic acid equivalents.

Preferably at least 50 mole percent, or more preferably at least 70 mole percent, or even more preferably at least 85 mole percent, or yet more preferably about 95-100 mole percent of the dicarboxylic acid equivalents used to prepared the polyetherester elastomers of the present inventions comprises terephthalic acid and/or dimethyl terephthalate The polyetherester elastomer of the present invention can be made using a conventional esterification or transesterification reaction, depending on the nature of the dicarboxylic acid equivalent. For example, dimethyl terephthalate can be heated with poly(trimethylene ether) glycol, and optionally, other glycols, and an excess of 1,4-butanediol, and, optionally, other diols, in the presence of a catalyst at 150 to 250° C., while distilling off the methanol formed by the ester exchange. The reaction is typically performed at a pressure of about 1 atmosphere. The reaction product is a mixture of the ester exchange reaction products of the dimethyl terephthalate and the poly(trimethylene ether) glycol and 1,4-butanediol, primarily bis(hydroxybutyl) terephthalate with varying amounts of (hydroxy-polytrimethylene ether) terephthalates with a small amount of the corresponding oligomers. The mixture then undergoes polymerization, for example polycondensation, to form a copolymer with a poly(trimethylene ether) soft segment and a tetramethylene terephthalate hard segment (which is a condensation product of 1,4-butanediol and dimethyl terephthalate). The polymerization can be followed by additional ester exchange and distillation to remove 1,4-butanediol and thus increase molecular weight. Polycondensation is typically performed under vacuum. Pressure is typically in the range of about 0.01 to about 18 mm Hg (about 1.3 to about 2400 Pa), preferably in the range of about 0.05 to about 4 mm Hg (about 6.7 to about 553 Pa) and most preferably about 0.05 to about 2 mm Hg. Polycondensation is typically run at a temperature in the range of about 220° C. to about 260° C.

To avoid excessive residence time at high temperatures and possible accompanying thermal degradation, a catalyst can be employed in the ester exchange. Catalysts useful in the ester exchange process include organic and inorganic compounds of titanium, lanthanum, tin, antimony, zirconium, and zinc. Titanium catalysts, such as tetraisopropyl titanate and tetrabutyl titanate, are preferred and are preferably used in an amount of at least about 25 ppm (preferably at least about 50 ppm and more preferably at least about 70 ppm) and up to about 1,000 ppm (preferably up to about 700 ppm and more preferably up to about 500 ppm) titanium by weight, based on the calculated weight of the finished polymer. Tetraisopropyl titanate and tetrabutyl titanate are also effective as polycondensation catalysts. Additional catalyst can be added after ester exchange or direct esterification reaction and prior to polymerization. Preferably the catalyst is tetrabutyl titanate (TBT).

Ester exchange polymerizations are generally conducted in the melt without added solvent, but inert solvents can be added to facilitate removal of volatile components, such as water and diols, at low temperatures. This technique is useful during reaction of the poly(trimethylene ether) glycol or the diol with the dicarboxylic acid equivalent, especially when it involves direct esterification, i.e., the dicarboxylic acid equivalent is a diacid. Other special polymerization techniques can be useful for preparation of specific polymers. Polymerization (polycondensation) can also be accomplished in the solid phase by heating divided solid product from the reaction of poly(trimethylene ether) glycol, a dicarboxylic acid equivalent, and a short chain diol in a vacuum and/or in a stream of inert gas to remove liberated diol. This type of polycondensation is referred to herein as "solid phase polymerization" (or abbreviated "SPP").

Alternative ester exchanges to those described above can be used. For example, poly(trimethylene ether) glycol can be reacted directly with a polyester (e.g., poly(butylene terephthalate)) in the presence of catalyst until randomization occurs. Suitable catalysts include catalysts recited hereinabove, and preferred are titanium catalysts such as tetrabutyl titanate.

Batch or continuous methods can be used for the processes described above or for any stage of poly(trimethylene ether) ester preparation. Continuous polymerization, by ester exchange, is preferred.

In preparing the polyether ester elastomers, it is sometimes desirable to incorporate known branching agents to increase melt strength. A branching agent is typically used in a concentration of 0.00015 to 0.005 moles per 100 grams of polymer. The branching agent can be, for example, a polyol having 3 or more hydroxyl groups, preferably 3-6 hydroxyl groups; a polycarboxylic acid having 3 or more carboxyl groups, preferably 3 or 4 carboxyl groups; or a hydroxy acid having a total of 3 or more hydroxyl and carboxyl groups, preferably 3-6 hydroxyl and carboxyl groups. Exemplary polyol branching agents include glycerol, sorbitol, pentaerytritol, 1,1,4,4-tetrakis(hydroxymethyl)cyclohexane, trimethylol propane, and 1,2,6-hexane triol. Exemplary polycarboxylic acid branching agents include hemimellitic, trimellitic, trimesic pyromellitic, 1,1,2,2-ethanetetracarboxylic, 1,1,2-ethanetricarboxylic, 1,3,5-pentanetricarboxylic, 1,2,3,4-cyclopentanetetracarboxylic and like acids. Although the acids can be used as is, it is preferred to use them in the form of their lower alkyl esters.

The weight percent soft segments in the polyetherester elastomers can be calculated according to the following formula:

$$\frac{(NG)(MnG + 32) + (Xss)(NR)(MnR + 56)}{(NG)(MnG + 32) + (NR)(MnR + 56) + (NR - NG)(MnDiol - 2)}$$

where:

NR is the number of moles of dicarboxylic acid equivalent used to make the polyetherester elastomer;

NG is the number of moles of PO3G and any polymeric or oligomeric glycols other than PO3G used to make the polyetherester elastomer;

MnR is the number average molecular weight of R, the divalent radicals remaining after the removal of carboxyl functionalities from the dicarboxylic acid equivalents used to make the polyetherester elastomer;

MnG is the number average molecular weight of G, the divalent radicals remaining after the removal of the terminal hydroxy groups from the PO3G and any polymeric or oligomeric glycols other than PO3G used to make the polyetherester elastomer;

MnDiol is the number average molecular weight of 1,4-butanediol and any additional diols used to form the hard segments; and Xss is the mole fraction of soft segment, defined as (NG)/(NR).

The weight percent of hard segments is determined by subtracting the weight percent of soft segments from 100 percent.

The number average molecular weights (Mn) of poly(trimethylene ether) glycols are determined either by analyzing hydroxyl end-groups using NMR spectroscopic method or by titration. To determine the Mn by titration, hydroxyl number is determined according to ASTM method E 222-00. The equivalent weight in g/equivalent is calculated by dividing 56100 by the hydroxyl number and Mn is calculated by multiplying the equivalent weight 2. Titration is the method that should be used to analyze whether something is within the scope of this invention.

The polyetherester elastomers of the present invention have improved high temperature physical properties. In one embodiment of the present invention, the tensile strength of polyetherester measured at 125° C. preferably has a tensile strength that is at least 30% of its tensile strength measured at 23° C. The tensile strength of polyetherester measured at 125° C. more preferably has a tensile strength that is at least 35% of its tensile strength measured at 23° C. The tensile strength of polyetherester measured at 125° C. yet more preferably has a tensile strength that is at least 40% of its tensile strength measured at 23° C. Tensile strength is measured on samples pulled at 200 mm/min according to ISO method 527-1:1993 (E) using type 5A tensile bars of dimensions defined by ISO method 527-2:1993(E).

The polyetherester elastomers of the present invention may be formed into compositions containing other components. The compositions may comprise, in addition to polyetherester elastomer, components such as heat stabilizers, light stabilizers, antioxidants, colorants, carbon black, nucleating agents, viscosity modifiers (such as crosslinkers), fillers and reinforcing agents (such as fibers, including glass fibers, and minerals), and flame retardants. The compositions may also comprise additional polymers such as thermoplastic polymers. Suitable thermoplastic polymers include as thermoplastic polyesters, including poly(butylene terephthalate), poly(ethylene terephthalate), and poly(propylene terephthalate).

The composition of the present invention may be formed by adding other components to the polymerization process when the polyetherester elastomer is made. The compositions of the present invention may also be formed by melt-blending the polymer of the present invention with other additives or by melt blending a composition containing the polyetherester elastomer of the present invention and components incorporated during polymerization with other additives. Any melt-blending method may be used to prepared the compositions of the present invention. For example, the polymeric components and non-polymeric ingredients may be added to a melt mixer, such as, for example, a single or twin-screw extruder; a blender; a kneader; or a Banbury mixer, either all at once through a single step addition, or in a stepwise fashion, and then melt-mixed. When adding the polymeric components and non-polymeric ingredients in a stepwise fashion, part of the polymeric components and/or non-polymeric ingredients are first added and melt-mixed with the remaining polymeric components and non-polymeric ingredients being subsequently added and further melt-mixed until a well-mixed composition is obtained.

The polyetherester elastomers and polyetherester elastomer compositions of the present invention may be formed into articles using methods known to those skilled in the art, such as, for example, injection molding, blow molding, extrusion, thermoforming, melt casting, rotational molding, and slush molding. The composition may be overmolded onto an article made from a different material. The composition may be extruded into films. The composition may be formed into monofilaments or fibers.

Articles comprising the polyetherester elastomers and polyetherester elastomer compositions of the present invention can include air bag doors, automotive dashboard components and other molded automotive interior parts, tubing, constant velocity joint boots, bellows, air ducts, hoses, brake hoses, mandrels, and automotive vacuum tubing.

EXAMPLES

The polyetherester elastomers of the examples were prepared in a 2 piece glass reaction vessel. The bottom part of the vessel had a capacity of about 2 L and an internal diameter of about 150 mm. It was connected to the top part of the vessel, a four-necked reactor top, by an O-ring and clamp. One neck was connected to a cold trap that served to condense volatile reaction products. The cold trap was in turn connected to a manifold capable of supplying an inert gas such as nitrogen or vacuum to the reaction vessel. The manifold included instruments for pressure measurement and further cold traps to protect the instruments and vacuum system from any volatiles that were not captured by the first trap. The vessel was stirred by a stainless steel paddle stirrer, the shaft of which passed through a neck in the center of the reactor top, which was fitted with a rotary vacuum seal. The control of the stirrer motor allowed for the stirring speed to be varied and included a measurement of the stirrer torque. The torque reading was used to assess when the polymer had reached a desired viscosity range. A third neck was fitted with a stopper that could be removed to add reaction components and a fourth neck was connected to a source of inert gas that could be fed at a low flow through the reactor in the latter stages of polymerization. The reactor was heated by immersion in bath containing a tin/bismuth metal alloy with a melting point of about 138° C. That bath was itself heated by an electrically powered heating mantle with a temperature controller.

The melt mass-flow rates (MFR) of the polymers made were measured by the method of International Standard ISO 1133:1977(E) at the temperature shown in Table 1 and using a weight of 2.16 kg. The polymers were all dried in a vacuum oven prior to making the measurement and had a moisture content of less than about 0.05 weight percent.

Test pieces for the measurement of mechanical properties were molded from polymer having a moisture content of less about 0.05 weight percent using a Ray-Ran Hand and Pneumatically Operated Test Sample Moulding Apparatus obtained from Ray-Ran Test Equipment Ltd. of Warwickshire, England.

Charpy impact tests were carried out using the method of International Standard ISO179:1993(E), method 1 eA. Test pieces of dimension 80×10×4 mm were directly molded on the Ray-Ran apparatus and the notch was machined as described in the standard. The results are shown in Table 1. Values quoted for Charpy impact strengths are in each case the average result obtained from at least 4 individual test specimens. For Charpy impact tests at −40° C. the samples were stored for about 1 hour in a container at −40° C. and were tested about 2 seconds after removal from that container.

Measurement of tensile properties was carried out by the method of International Standard ISO527-1:1993(E). Test specimens used were type 5A as described in International Standard ISO527-2: 1993(E). These specimens were die-cut from plaques of dimensions 80×38×2 mm molded on the Ray-Ran Apparatus. The tensile tests were carried out at a speed of 200 mm/min. The results are shown in Table 1. Values quoted for tensile strength are in each case the average result obtained from at least 4 individual test specimens. For the tests at 125° C. and at −40° C. the necessary parts of the testing apparatus were enclosed in an environmental chamber and the test specimens were left in that chamber to equilibrate to the test temperature before testing was carried out.

The poly(trimethylene ether) glycols used in the examples were prepared by the methods described in U.S. Patent Application Publication No 2002/0007043. The number average molecular weights of the poly(trimethylene ether) glycols were determined by $^1$H NMR spectroscopy.

Irganox® 1098 and Irganox® 1019 are sterically hindered phenolic antioxidants that were obtained from Ciba Specialty Chemicals.

Example 1

The reaction vessel described above was charged with 340.5 g of 1,4-butanediol (about twice the stoichiometrically required amount), 247.1 g of PO3G having a number average molecular weight of 1049, 416.5 g of dimethyl terephthalate, 0.54 g of trimethyl trimellitate, 1.05 g of Irganox® 1098 and 1.05 g of Irganox® 1019. This mixture was gently stirred whilst vacuum was applied to the reactor which was then backfilled with nitrogen 3 times to create an inert atmosphere. The reactor was then immersed in the hot metal bath at a temperature of 160° C. until the ingredients were molten. At that point the stopper was removed from the reactor top under a flow of nitrogen, and 2.1 g of tetrabutyl titanate catalyst was added to the reactor mixture. With the stopper replaced the temperature was set to increase to 210° C. During this time transesterification took place, releasing methanol, which was collected in the cold trap. After about 40 minutes this phase of the reaction was complete, the methanol was removed from the cold trap, taking care to maintain an inert atmosphere, and the set temperature was increased to 240° C. Once this temperature was reached, the pressure was slowly reduced to 65 torr and polymerization was allowed to continue for about 20 minutes under these conditions. Pressure was controlled by balancing a small nitrogen flow into the manifold after the first cold trap with a needle valve to the vacuum system. The temperature was then raised to 250° C. and the pressure reduced to 17 torr and these conditions were maintained for about 20 minutes. The temperature set point was then raised to 260° C. and once that temperature was reached the pressure was reduced to about 1 torr. For this final stage of polymerization the small nitrogen flow was bled directly into the reactor through one of the necks rather than into the manifold after the first trap. These conditions were maintained for about 30 minutes after which the stirrer was stopped, the reactor was backfilled with nitrogen, the reactor top was removed and the polymer was scraped out of the reactor whilst still hot. Once solidified, the polymer was cut into small pieces. The ingredients added were sufficient for approximately 700 g of polymer and about 550 g of this was recovered from the reactor.

Example 2 and 4-9 and Comparative Examples 1-3

The procedure of Example 1 was repeated using the ingredients and quantities shown in Table 2. For each composition the number average molecular weight of the PO3G used is also given in the table. In each case all ingredients other than the tetrabutyl titanate catalyst were charged to the reactor at the start of the procedure and the catalyst was added after melting of the ingredients, as described in example 1. In each case the ingredients added were sufficient to make approximately 700 g of polymer and about 550 g was recovered from the reactor.

Example 3

The procedure of Example 1 was used, except that a three-necked flask reaction vessel was used and catalyst was introduced through the through the neck to which the cold trap was attached. The temperature was held at about 240° C. for about 18 minutes, at 250° C. for about 14 minutes, and at 260° C. for about 90 minutes. During the time at which the polymer was held at 260° C., no nitrogen was bled into the reactor. Ingredients sufficient to make approximately 650 g of polymer were added to the reactor.

The physical properties of the polyetherester elastomers of Examples 1-9 and Comparative Examples 1-3 were determined. Tensile strengths were measured at 23, 125, and −40° C. and the results are shown in Table 1. The percent retention of tensile strength at 125° C. relative to the tensile strength measured at 23° C. is indicated in Table 1 under the heading of "% retention at 125° C.". Charpy impact strengths were measured at 23 and −40° C. and the results are shown in Table 1. "NB" indicates that the specimen did not break on impact. "PB" indicates that the specimen partially broke on impact.

A comparison of Examples 1-4 with Comparative Example 1 demonstrates that polyetherester elastomers of the present invention having about 38 to 40 weight percent soft segment retain their tensile strengths at 125° C. relative to 23° C. to a significantly greater degree than polyetherester elastomers having about 40 weight percent soft and a number average molecular weight of about 2900. Furthermore, polyetherester elastomers of the present invention having about 38 to 40 weight percent soft segment have improved low temperature impact strengths relative to polyetherester elastomers having about 40 weight percent soft segment and a number average molecular weight of about 2900.

A comparison of Examples 5 and 6 with Comparative Example 2 demonstrates that polyetherester elastomers of the present invention having about 55 weight percent soft segment retain their tensile strengths at 125° C. relative to 23° C. to a significantly greater degree than polyetherester elastomers having about 55 weight percent soft segment and a number average molecular weight of about 2900. Furthermore, polyetherester elastomers of the present invention having about 55 weight percent soft segment have improved low temperature impact strengths relative to polyetherester elastomers having about 55 weight percent soft segment and a number average molecular weight of about 2900

A comparison of Examples 7-9 with Comparative Example 3 demonstrates that polyetherester elastomers of the present invention having about 30 weight percent soft segment retain their tensile strengths at 125° C. relative to 23° C. to a significantly greater degree than polyetherester elastomers having about 30 weight percent soft segment and a number average molecular weight of about 2900. Furthermore, polyetherester elastomers of the present invention having about 30 weight percent soft segment have improved low temperature impact strengths relative to polyetherester elastomers having about 30 weight percent soft segment and a number average molecular weight of about 2900

TABLE 1

|  | Ex. 1 | Ex. 2 | Ex. 3 | Ex. 4 | Comp. Ex. 1 | Ex. 5 | Ex. 6 | Comp. Ex. 2 | Ex. 7 | Ex. 8 | Ex. 9 | Comp. Ex. 3 |
|---|---|---|---|---|---|---|---|---|---|---|---|---|
| Weight percent soft segment | 40 | 38 | 40 | 40 | 40 | 55 | 55 | 55 | 30 | 30 | 30 | 30 |
| PO3G Mn | 1050 | 1530 | 1820 | 2050 | 2880 | 1530 | 2060 | 2880 | 1050 | 1530 | 2060 | 2880 |

TABLE 1-continued

|  | Ex. 1 | Ex. 2 | Ex. 3 | Ex. 4 | Comp. Ex. 1 | Ex. 5 | Ex. 6 | Comp. Ex. 2 | Ex. 7 | Ex. 8 | Ex. 9 | Comp. Ex. 3 |
|---|---|---|---|---|---|---|---|---|---|---|---|---|
| Melt mass-flow rate (g/10 min) | | | | | | | | | | | | |
| 220° C./2.16 kg | — | — | — | — | — | 23.1 | 8.5 | 13 | — | — | — | — |
| 230° C./2.16 kg | 7.9 | 10.7 | 30.3 | 7.2 | 17 | — | — | — | 16 | 14 | 10 | 16 |
| Tensile strength (MPa) | | | | | | | | | | | | |
| @23° C. | 31.8 | 31.7 | 32.7 | 30.3 | 22.3 | 22.6 | 20.7 | 15.1 | 38.3 | 41.9 | 41.8 | 28.6 |
| @125° C. | 15.6 | 16.8 | 17.2 | 16.3 | 5.9 | 8.8 | 9.6 | 3.2 | 26.8 | 28.7 | 24.3 | 13.5 |
| @-40° C. | 37.9 | 36.1 | 30.5 | 34.3 | 45 | 31.4 | 29.2 | 34 | 57.7 | 48.7 | 47.3 | 57.3 |
| % Retention at 125° C. | 49 | 53 | 53 | 54 | 26 | 39 | 46 | 21 | 70 | 68.5 | 58.1 | 47.2 |
| Notched Charpy impact strength (kJ/m²) | | | | | | | | | | | | |
| @23° C. | NB | NB | NB | NB | 79 | NB | NB | NB | 96.2 | 97.1 | 97.7 | 67.5 |
| @-40° C. | 31.4 | 33.5 | 41.2 | 108.5 (PB) | 11.9 | 93 (PB) | 75 (PB) | 6.3 | 10 | 13.8 | 14.8 | 7.7 |

TABLE 2

|  | Ex. 1 | Ex. 2 | Ex. 3 | Ex. 4 | Comp. Ex. 1 | Ex. 5 | Ex. 6 | Comp. Ex. 2 | Ex. 7 | Ex. 8 | Ex. 9 | Comp. Ex. 3 |
|---|---|---|---|---|---|---|---|---|---|---|---|---|
| Weight percent soft segment | 40 | 38 | 40 | 40 | 40 | 55 | 55 | 55 | 30 | 30 | 30 | 30 |
| PO3G Mn | 1050 | 1530 | 1820 | 2050 | 2880 | 1530 | 2060 | 2880 | 1050 | 1530 | 2060 | 2880 |
| Weight of ingredients charged (g) | | | | | | | | | | | | |
| 1,4-butanediol | 340.5 | 340.3 | 238 | 341.6 | 341.7 | 257.7 | 257.7 | 257.7 | 400.2 | 400.5 | 400.3 | 400.3 |
| PO3G | 247.1 | 247.1 | 242 | 263.2 | 267.1 | 354 | 361.1 | 367 | 186.6 | 193.2 | 197.2 | 200.7 |
| Dimethyl terephthalate | 416.5 | 416.5 | 368 | 393.4 | 386.8 | 322.4 | 311.7 | 301 | 465.9 | 456.8 | 450.0 | 444.8 |
| Trimethyl trimellitate | 0.54 | 0.55 | 0.48 | 0.51 | 0.51 | 0.84 | 0.81 | 0.79 | 0 | 0 | 0 | 0 |
| Irganox ® 1098 | 1.05 | 1.05 | 0.98 | 1.05 | 1.05 | 0.7 | 0.7 | 0.7 | 1.05 | 1.05 | 1.05 | 1.05 |
| Irganox ® 1019 | 1.05 | 1.05 | 0.98 | 1.05 | 1.05 | 0 | 0 | 0 | 0 | 0 | 0 | 0 |
| Tetrabutyl titanate | 2.1 | 2.1 | 1.95 | 2.1 | 2.1 | 2.1 | 2.1 | 2.1 | 2.1 | 2.1 | 2.2 | 2.1 |

What is claimed is:

1. A polyetherester elastomer comprising about 25 to 59 weight percent of soft segments based on the total weight of the elastomer, wherein about 60 to 100 mole percent of the soft segments are poly(trimethylene ether) ester soft segments represented by the structure:

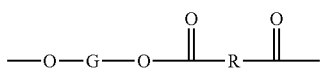

and 41 to about 75 weight percent of hard segments based on the total weight of the elastomer, wherein about 80 to 100 mole percent of the hard segments are tetramethylene ester hard segments represented by the structure:

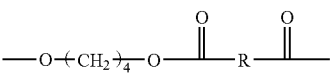

wherein G represents the divalent radical remaining after the removal of the terminal hydroxy groups of poly(trimethylene ether) glycol having a number average molecular weight of about 500 to about 2500, and R is one or more divalent radicals remaining after removal of carboxyl functionalities from one or more corresponding dicarboxylic acid equivalents; and wherein the polyetherester has a tensile strength measured at 125° C. that is at least 30 percent of its tensile strength measured at 23° C.

2. The polyetherester of claim 1, comprising about 30 to 59 weight percent of poly(trimethylene ether) ester soft segments and 41 to about 70 weight percent of hard segments.

3. The polyetherester of claim 1, comprising 35 to 59 weight percent of poly(trimethylene ether) ester soft segments and 41 to about 70 weight percent of hard segments.

4. The polyetherester of claim 1, wherein G represents the divalent radical remaining after the removal of the terminal hydroxy groups of poly(trimethylene ether) glycol having a number average molecular weight of about 800 to about 2300.

5. The polyetherester of claim 1, wherein G represents the divalent radical remaining after the removal of the terminal hydroxy groups of poly(trimethylene ether) glycol having a number average molecular weight of about 950 to about 2100.

6. The polyetherester of claim 1, wherein R comprises at least 50 mole percent divalent radicals remaining after removal of carboxyl functionaries from terephthalic acid and/or dimethyl terephthalate.

7. The polyetherester of claim 1, wherein R comprises at least 70 mole percent divalent radicals remaining after removal of carboxyl functionaries from terephthalic acid and/or dimethyl terephthalate.

8. The polyetherester of claim 1, wherein about 90 to 100 mole percent of the hard segments are tetramethylene ester hard segments.

9. A polyetherester composition comprising the polyetherester of claim 1.

10. The composition of claim 9 further comprising one or more of at least one heat stabilizer, light stabilizer, antioxidant, colorant, carbon black, nucleating agent, viscosity modifier, filler, reinforcing agent, and/or flame retardant.

11. The composition of claim 9 further comprising about 1 to about 50 weight percent of a polymer other than polyetherester elastomer, based on the total weight of the composition.

12. The composition of claim 11 wherein the polymer is a thermoplastic polyester.

13. A molded article comprising the polyetherester elastomer of claim 1.

14. An extruded article comprising the polyetherester elastomer of claim 1.

15. The extruded article of claim 14 in the form of a tube, hose, or mandrel.

16. The molded article of claim 13 in the form of an air bag door.

17. The molded article of claim 13 in the form of a constant velocity joint boot or bellows.

18. The molded article of claim 13 in the form of an air duct.

19. The polyetherester elastomer of claim 1 comprising about 25 to 55 weight percent of soft segments and 45 to about 75 weight percent of hard segments.

* * * * *